No. 715,142. Patented Dec. 2, 1902.
N. P. PRATT.
METHOD OF MANUFACTURING SULFURIC ACID.
(Application filed Dec. 21, 1901.)
(No Model.) 2 Sheets—Sheet 2.
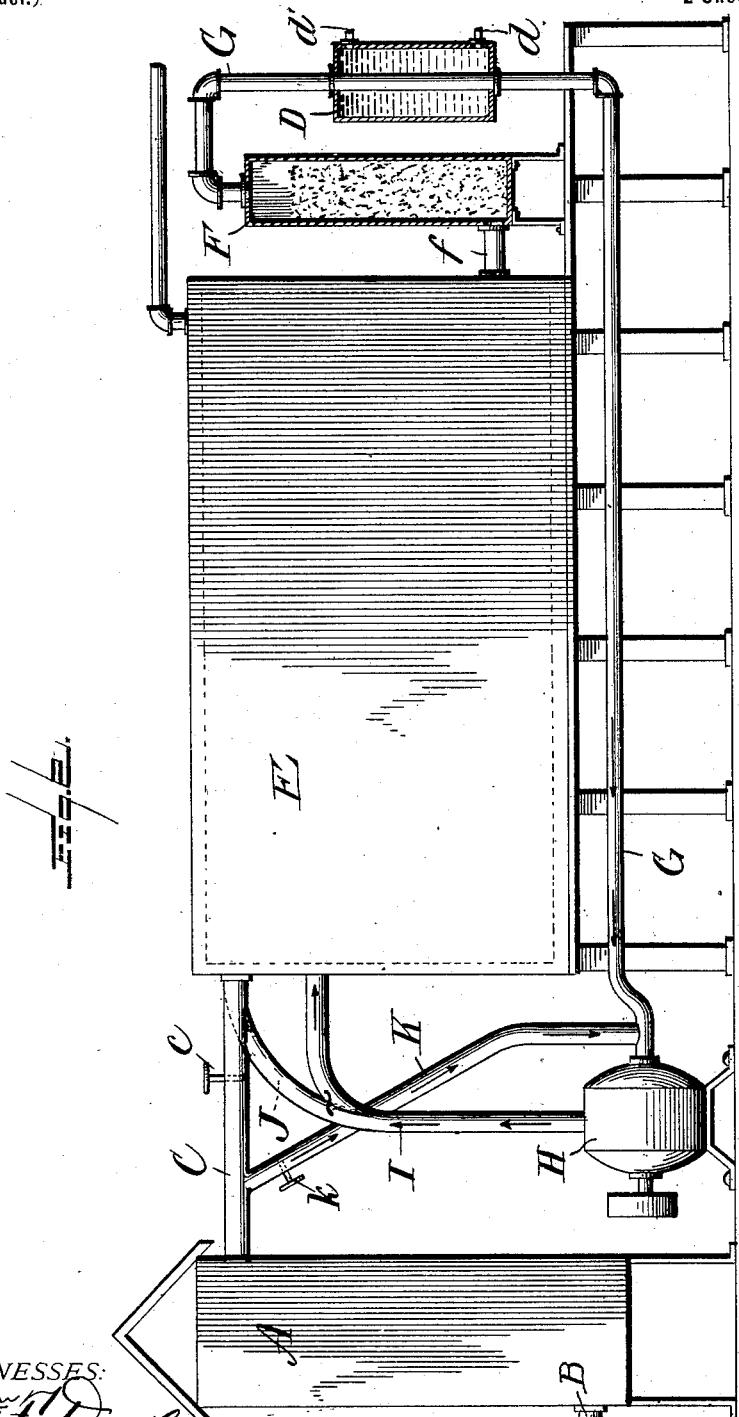
WITNESSES:
INVENTOR
Nathaniel P. Pratt.
by his attorney

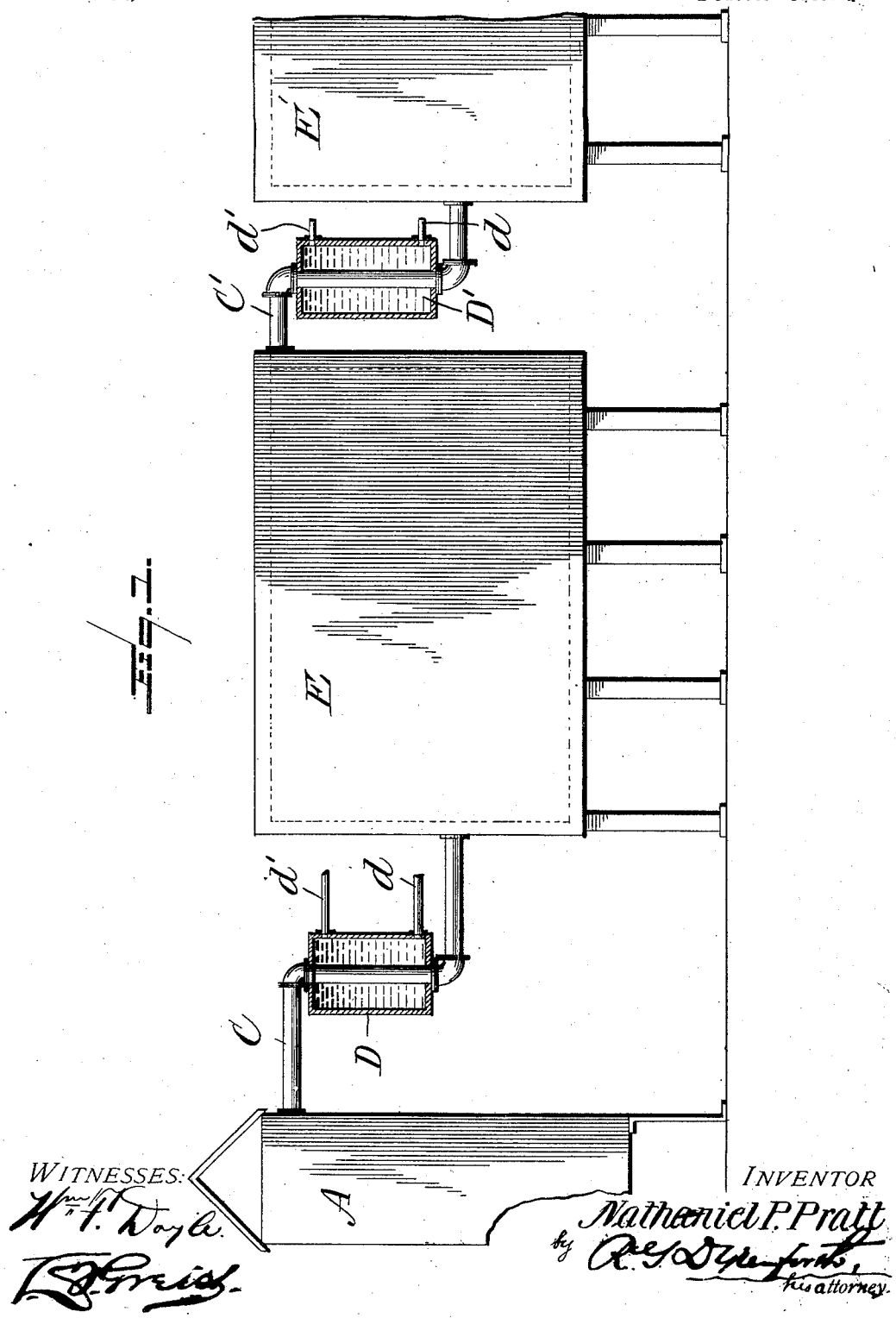

UNITED STATES PATENT OFFICE.

NATHANIEL P. PRATT, OF ATLANTA, GEORGIA.

METHOD OF MANUFACTURING SULFURIC ACID.

SPECIFICATION forming part of Letters Patent No. 715,142, dated December 2, 1902.

Application filed December 21, 1901. Serial No. 86,809. (No specimens.)

*To all whom it may concern:*

Be it known that I, NATHANIEL P. PRATT, a citizen of the United States, residing at Atlanta, in the county of Fulton and State of Georgia, have invented certain new and useful Improvements in Methods of Manufacturing Sulfuric Acid; and I do hereby declare the following to be a full, clear, and exact description of the invention, such as will enable others skilled in the art to which it appertains to make and use the same.

My invention consists in a method by which the gases and the materials connected with the manufacture of sulfuric acid may be rapidly and effectively cooled without loss or dilution and by a process other than the present unsatisfactory practice of cooling the same by convection or radiation of the heat therein contained through the apparatus to the surrounding atmosphere at its ordinary temperature. I produce this effect by causing the gases and other materials which it is desired to cool to pass through chambers, pipes, or conduits surrounded by or in contact with the cooling medium—such as water, ice, or refrigerating gases or liquids—thus largely increasing proportionately the amount of surface area subject to the action of the cooling medium, whereby the removal of the heat from the same will be greatly accelerated.

My invention consists in the process broadly outlined above without regard to the particular form of plant or apparatus utilized in the manufacture of the acid, the essential feature of my invention being the method, as above set out and more explicitly defined hereinafter, of cooling the gases or materials in the chambers, the towers, or any of the flues or conduits by surrounding such containers or conducting-passages with a cooling medium, whereby the contents will be cooled, but not allowed to come in contact or to mix with the cooling medium, whereas heretofore it has been usual to effect the necessary cooling by convection or radiation of the heat through the apparatus to the surrounding atmosphere at its ordinary temperature.

It is customary at all well-conducted plants to cool the sulfuric acid as it emerges from the hot Glover tower by subjecting the acid in pipes, &c., to the cooling action of surrounding water before this acid is returned to the Gay-Lussac tower; but my invention is not to be confused with this practice of cooling sulfuric acid which has been actually made. I accelerate the production of the acid by subjecting the materials out of which it is made to a special cooling process while chemical action is taking place between such materials and also withdraw the heated uncombined gases and after cooling return the same to the acid-producing space mixed with freshly-generated gases.

The atmosphere surrounding the ordinary apparatus varies from the freezing-point or below in winter to 110° Fahrenheit or more in summer. It will therefore be clearly seen that any special method of cooling by means of a medium at a low and fairly-constant temperature, such as well-water, is greatly to be desired. The production of acid is not only greatly accelerated, but undesirable variations and fluctuations in its make are avoided.

While, as stated, my improved method may be adopted in connection with any ordinary sulfuric-acid plant upon slight modification of apparatus to suit the requirements of the process, yet to render perfectly clear the application of the method in the accompanying drawings (in which like letters of reference indicate corresponding parts) I have illustrated diagrammatically so much of an ordinary sulfuric-acid plant as will serve to elucidate the application of my process of cooling the gases.

In the drawings, Figure 1 is a side elevation, partly in section, of one form of sulfuric-acid plant; and Fig. 2 is a similar view of a modified form of plant.

Referring to the drawings, and particularly to Fig. 1 thereof, A is the Glover tower, communicating, as usual, with the generators (not shown) by the flue B and by the flue C, passing through a water-jacket D, with the usual lead or acid chamber E, or, if desired, the lead chambers may be in series, as E and E', and connected by flue C', passing through water-jacket D'. These acid-chambers communicate at the rear by flue (not shown) with the Gay-Lussac tower. (Not shown.) The water-jackets D and D', surrounding the flues C and C', are provided with the usual inlets $d$ and outlets $d'$, by means of which the water is constantly changed.

Referring to Fig. 2, in which is shown a modified application of my process in addition to the parts shown in Fig. 1, a converter F is shown as located at the rear of the lead chamber E and connected therewith at the bottom by the flue $f$ and at the top by means of the flue G, passing through a water-jacket D and leading to an exhaust-fan H, by means of which the uncombined gases are drawn from the lead chamber through the converter, cooled by the water-jacket, and, after passing through the fan H, forced through flue I again into the lead chamber and there mixed with the freshly-entering gases, or by means of the flue J (shown in dotted lines) they may be caused to mingle with the fresh gases prior to entering the lead chamber. K is a shunt passage or flue containing a valve $k$ and connecting the flue C, containing the valve $c$, with the flue G. By means of this shunt-passage the freshly-generated gases may be diverted and caused to mix with those drawn from the rear of the apparatus in the flue G or fan H and thence discharged together into the lead chamber E.

The operation of the plant, in brief, but with especial reference to my improved method of cooling, is as follows: While the hot gases and materials are in the chambers, towers, conduits, or flues, or are passing through them, I surround them with a device containing a special cooling medium, such as circulating water or other suitable liquid or gas, and in this way appropriate and remove the heat therefrom.

While the drawings illustrate the application of the method to the connecting-flues, it will be understood that the principle may be applied at or in connection with any part of the apparatus, as desired.

The apparatus shown and described forms no part of my invention as claimed by me herein, for the reason that my improved method is independent of any particular form of apparatus and may be adapted to any acid-producing plant of ordinary construction. Therefore I do not wish to be limited to a process carried out by any specific form of apparatus. Further, while I prefer to use cold water as the cooling medium, it will be obvious that other liquids, ice, or any refrigerating-gas may be utilized without departing from the spirit of my invention, and that, if desired, the gases may be caused to pass over coils of pipe containing the refrigerating medium.

Wherefore, having thus fully described my invention, what I claim as new, and desire to secure by Letters Patent, is—

1. In the manufacture of sulfuric acid, the method of withdrawing the uncombined gases from the acid-chambers, cooling and mixing with freshly-generated gases, and returning to the acid-chamber along with the freshly-generated gases, substantially as described.

2. In the manufacture of sulfuric acid, the method of withdrawing the uncombined gases from the rear of the acid-chambers, cooling and mixing with freshly-generated gases, and returning the mixture into the front of the acid-chambers, substantially as described.

3. In the manufacture of sulfuric acid, the method of withdrawing the heated nitrous anhydrid from the rear of the acid-chambers, cooling and mixing with freshly-generated gases, and returning the mixture into the front of the acid-chambers, substantially as described.

4. In the manufacture of sulfuric acid, the method of treating the gases and materials connected therewith, which consists in subjecting the uncombined gases, after passage through the lead chamber, to the influence of a cooling medium, without admixture therewith, and then reintroducing the cooled gases to the acid-chambers, after mixture with freshly-generated gases, substantially as described.

5. In the manufacture of sulfuric acid, the method of treating the gases and materials connected therewith, which consists in subjecting the gases, during chemical combination, to the influence of a cooling medium, without admixture, similarly cooling the uncombined gases, after leaving the lead chamber, and reintroducing them to the acid-chamber, after being previously mixed with freshly-generated gases, substantially as described.

6. In the manufacture of sulfuric acid, the method of withdrawing from the acid-chambers the uncombined gases, subjecting the same to a positive cooling action, mechanically mingling such cooled gases with the freshly-generated gases and introducing such mixed gases into the acid-chamber, substantially as described.

In testimony whereof I affix my signature in the presence of two subscribing witnesses.

NATHANIEL P. PRATT.

Witnesses:
T. BARTON FORD,
A. N. SALLY.